United States Patent [19]

Gunti

[11] 4,256,222
[45] Mar. 17, 1981

[54] TRANSFER CONVEYOR FOR THE TRANSFER OF PIECE GOODS FROM A FIRST ROLLER TRACK CONVEYOR TO A SECOND ROLLER TRACK CONVEYOR

[75] Inventor: Rolf Gunti, Laufen, Switzerland

[73] Assignee: Masyc A.G., Munchenstein, Switzerland

[21] Appl. No.: 936,629

[22] Filed: Aug. 24, 1978

[30] Foreign Application Priority Data

Aug. 25, 1977 [CH] Switzerland .............. 10419/77

[51] Int. Cl.³ .............................................. B65G 47/52
[52] U.S. Cl. ...................................... 198/457; 193/36; 198/367; 198/597
[58] Field of Search .............. 198/362, 366, 367, 369, 198/370, 372, 440, 457, 470, 476, 597, 598, 809; 193/35 SS, 36

[56] References Cited

U.S. PATENT DOCUMENTS

| | | | |
|---|---|---|---|
| 3,067,851 | 12/1962 | O'Rourke, Jr. | 198/470 |
| 3,134,476 | 5/1964 | Pierson et al. | 198/457 X |
| 3,191,747 | 6/1965 | Pollard | 198/367 |
| 3,269,519 | 8/1966 | DeGood et al. | 198/367 |

FOREIGN PATENT DOCUMENTS 2515024  3/1976  Fed. Rep. of Germany.

Primary Examiner—Jeffrey V. Nase
Attorney, Agent, or Firm—Anthony J. Casella

[57] ABSTRACT

A transfer conveyor, for the transfer of piece goods from a first roller track conveyor to a second roller track conveyor, is disclosed which comprises a fixed base and a first frame carrying rollers rotatably mounted on the first frame and engaging inclined ramps fixed on the base. The first frame carries two endless conveying chains extending in parallel vertical planes spaced apart in the conveying direction of the roller track conveyors, said chains having horizontal upper runs which in a lowered position of the first frame lie below the conveying plane of the roller track conveyors and in a raised position of the first frame are above that conveying plane so that articles can be transferred, in a transverse direction from the first to the second roller track conveyor. The first frame is raised and lowered by drawing the frame longitudinally so that the rollers run up and down the ramps.

9 Claims, 2 Drawing Figures

TRANSFER CONVEYOR FOR THE TRANSFER OF PIECE GOODS FROM A FIRST ROLLER TRACK CONVEYOR TO A SECOND ROLLER TRACK CONVEYOR

The invention relates to means for selectively transferring piece goods from the conveying path of a first piece-goods conveyor to the conveying path of a second piece-goods conveyor by means of a transfer conveyor having below the conveying plane of the piece goods conveyors conveying chains rotating endlessly around reversing rolls transversely of the conveying direction at least of the first piece goods conveyor.

In known means of this kind disclosed by German Offenlegungsschrift No. 2 259 273, the transport chains have lifting links which in their normal position are below the plane of conveyance and in the transfer position project simultaneously thereabove at a predetermined distance apart from one another, such distance being less than the width of a single article to be conveyed. Near the plane of conveyance the transport chains run over guide bars formed with camming surfaces, the lifting links rising on an approach ram and being lowered on exit or trailing ramps. Lifting links disposed on opposite sides of a conveying chain are separated from one another by a predetermined amount less than the width of the articles to be transferred. Associated with each lifting link is its own camming path, and the approach and exit ramps of the two adjacent camming paths must be offset from one another at the same predetermined separation.

The disadvantage of this known facility is that guide rails or bars formed with camming ways and approach and exit ramps must be provided. Also, a resilient chain tensioner must be provided for each individual conveying chain, since the chain experiences peripheral distortion in its movement when the lifting links run up the approach ramps and run down over the exit ramps. In short, the known facility comprises a large number of separate components which move relatively to one another during a conveying movement of the conveying chain and therefore experience heavy wear. The known facility cannot be used to convey large and heavy articles because of the heavy wear of the lifting links, with the attendant risk of individual parts tilting.

U.S. Pat. No. 3,104,004 discloses a facility having a rotating chain disposed at an inclination to the horizontal, fingers or the like being disposed one behind another on a part of the chain. The height of the fingers increases from front to rear as considered in the direction of movement so that all the fingers project simultaneously over the plane of the piece conveyor and raise an article.

Since the fingers have to be of different sizes, the production and assembly of this known facility is very elaborate, nor can it be used to transfer piece articles between two parallel conveyors since the transfer facility itself requires considerable power to deposit an article which it has raised on a second piece conveyor extending transversely of the transfer direction, the reason being that in such a case the set of fingers must be pulled out below the article, retained by an abutment, only while the article itself is raised. This known facility cannot be used to convey bulky heavy items.

In another facility, disclosed by German Offenlegungsschrift No. 2 515 024, the lifting links are pivoted to the conveying chains in the form of pivoting levers pivoted by pins which, as the conveying chain moves, can move into engagement with cams of the pivot levers so that the same project from the plane of the piece conveyors and raise an article thereon. This known construction has a large number of relatively moving parts which suffer heavy wear and cannot be used to raise and laterally convey large and heavy items without the risk of breaking some of the pivoting levers.

It is an object of the invention to provide means for selectively transferring piece goods by means of a transfer conveyor of the kind previously mentioned, the means being constructed from simple components yet providing reliable transfer even of large bulky and/or heavy items.

According to the invention, therefore, the entire transfer conveyor can be raised into its conveying position above the or each conveying plane of the piece goods conveyors.

The conveying chain, which experiences wear, can therefore be of very simple construction. No complicated lifting or pivoting members which in the known facilities break easily or become unserviceable when they have to deal with heavy loads are required. Both in its conveying position and in its non-conveying position the conveying chain describes substantially the same orbit as it rotates, the chain run which is in the conveying region extending linearly and therefore being easy to guide. According to the invention, this run can be used to convey even heavy loads.

Preferably, the transfer conveyor is adapted to be raised and lowered by means of a motor-driven lifter which moves the whole transfer conveyor smoothly.

In a preferred form of the invention, the lifter can be basically embodied by stationary ramps and bearing rolls, the transfer conveyor which is borne by the rolls being liftable by the stationary ramps, the rolls being in rolling engagement therewith. The constructional idea is used of a roller which runs on an inclined plane serving to lift heavy loads, the bearing rollers experiencing substantially zero wear during lifting. The bearing rolls have the same function as the lifting and pivoting members of the known conveyors, which have many such components. In constrast, the number of bearing rolls required for the purpose of the invention can be quite reduced provided that they are sufficient to ensure that the static requirements for being the transfer conveyor are complied with.

The transfer conveyor can be adapted to be pulled into its conveying position on to the ramps by means of a stationary cable drive. If leverages are appropriate, a single operator can even lift heavy loads manually, e.g. through the agency of a block and tackle or of a winch with a crank. Preferably, however, the cable is motor driven.

Advantageously, the cable drive is controllable in synchronism with the driving motor for the rotating conveying chains. This simple interlock ensures that the conveying chains can rotate only when the transfer conveyor is in its raised position. Intermittent operation thereof saves wear and tear of the conveying chain and reduces power consumption.

Preferably, with the transfer conveyor in the conveying position, its bearing rolls are in engagement with an inclined surface of the ramps. The cable of the cable drive therefore remains tensioned in the conveying position and the transfer conveyor can be lowered into its inoperative position without a dead-centre position having to be overcome.

Similarly, with the transfer conveyor in its inoperative (non-conveying) position, the rolls can be in engagement with an inclined surface of the ramps. Consequently, the cable remains tensioned in this case too so that the transfer conveyor unit can be raised subsequently without loss of time.

However, means can be provided to lock the transfer conveyor in its inoperative and operative positions so as to reduce the load on the cable.

A rack and pinion drive can be used instead of the ramp feature to lift the transfer conveyor. Hydraulic or pneumatic lifters can be used.

Preferably, the transfer conveyor has at least two spaced-apart parallel synchronously controlled conveying chains. Articles and therefore be borne, raised and conveyed satisfactorily.

In another preferred form of the invention, the conveying chain is guided by reversing rolls on both sides of the driving sprocket. This feature ensures an accurate drive of the conveying chain around much of the sprocket periphery.

In one form of the invention, the chain-driving motor is fixedly mounted on the transfer conveyor. However, the driving motor can be fixed to the ground, in which event compensating rollers mounted on the transfer conveyor for pivoting or displacement are used to bear the conveying chain. Disposing the chain-driving motor on the ground reduces the self-weight of the transfer conveyor which it is required to lift.

Advantageously, a number of running rollers are provided on both sides of the conveying chain along the chain run and, with the conveying chain in the conveying position, ared pressed by the self-weight of the piece article to be conveyed against a bearing surface for the rollers, such surface being stationary relatively to the transfer conveyor. Rotation of the running rollers is a simple way of increasing the conveying speed of an article substantially to twice the speed of rotation of the conveying chain.

As a preferred feature in this form of the invention, the bearing surface takes the form of a guide rail for the running rolls, thus providing an additional guide for the conveying chain.

At least one conveying roll of each piece-conveyor can be disposed between spaced-apart conveying chains.

According to another feature of the invention, the lifter is controllable in dependence upon the weight or size of an article to be conveyed. It then becomes a simple matter for the transfer conveyor according to the invention, in association with two corresponding piece conveyors disposed preferably parallel to one another, to be used as a sorting facility.

The invention will be described in greater detail hereinafter with reference to an embodiment and to the accompanying drawings wherein:

FIG. 1 shows a transfer conveyor disposed between two parallel piece-goods conveyors 2, 3.

Figure 1:
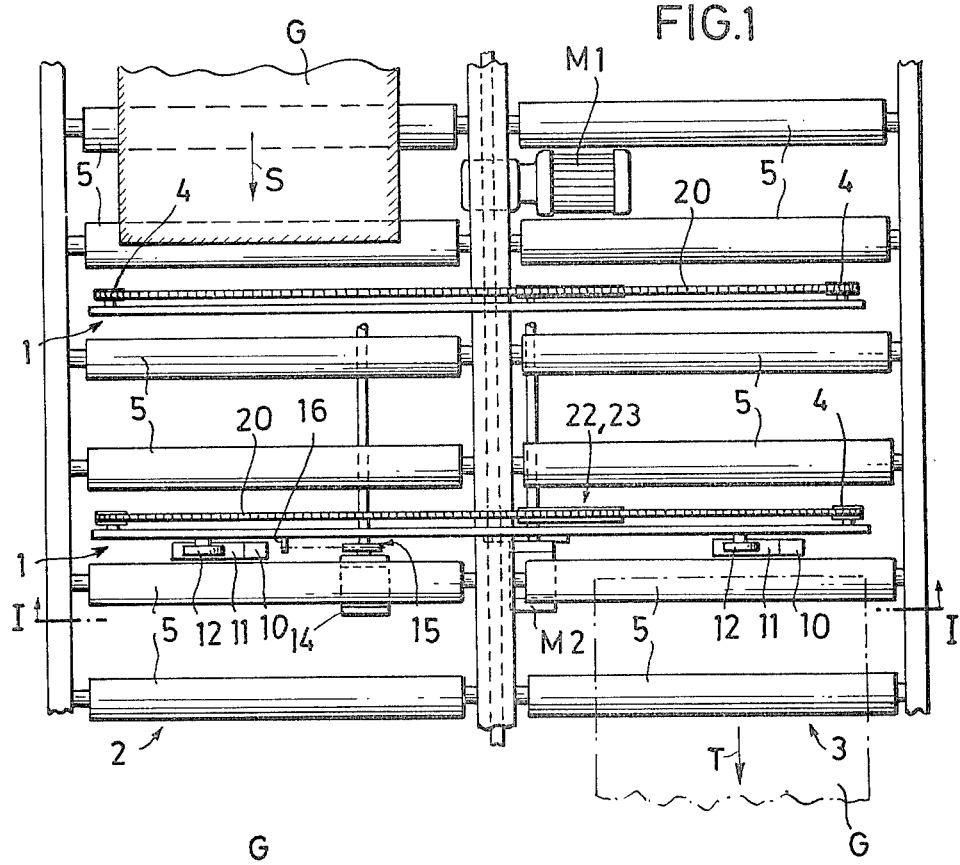
FIG. 1 is a diagrammatic plan view of means according to the invention for selectively transferring piece goods and comprising a first piece conveyor, a second piece conveyor and, disposed therebetween, a transfer conveyor.

The conveyors 2, 3 mainly comprise a number of rotatably mounted and horizontally disposed rolls 5 which a drive unit $M_1$ can rotate to advance a piece-goods article G.

The transfer facility comprises a stationary base 6 and the movable transfer conveyor 1. Rigidly secured to the top of the base 6 near each conveyor 2 and 3 is a ramp 10 having inclined top surface 11 operatively associated with a bearing roll 12 rotatably mounted on conveyor 1, the same bearing by way of the rolls 12 on its base 6.

Also secured to the top of the base 6 but between the ramps 10 is a cable drive 14 having a drivable winch 15 on which a cable or possibly a chain is wound. The free end of the cable or chain is secured to a place 16 on the underside of conveyor 1.

The identical ramps 10, the rolls 12 and the drive 14 are so devised that the winding of the rope or chains on to the winch 15 raises the transfer conveyor 1 from below to above the conveying plane of the conveyors 2, 3, the rolls 12 rolling on the corresponding surfaces 11 of the ramps 10 upwards and to the right in FIG. 2. The rolls 12 are in engagement with their corresponding inclined surfaces 11 both in their bottom and top positions, so that the cable or chain of the drive 14 remains tensioned throughout the raising and lowering of the transfer conveyor 1, thus ensuring smooth and rapid operation.

The conveyor 1 comprises two parallel conveying chains 20 whose top run moves from the first conveyor 2 towards the second conveyor 3 in the direction indicated by an arrow R, the bottom rung of the chains 20 returning below the two conveyors 2, 3. The distance between the two chains 20 is less than the size of the articles G to be conveyed so that the two chains 20 can support the articles G for transverse conveyance on the conveyor 1 in the direction indicated by an arrow R.

Figure 2:
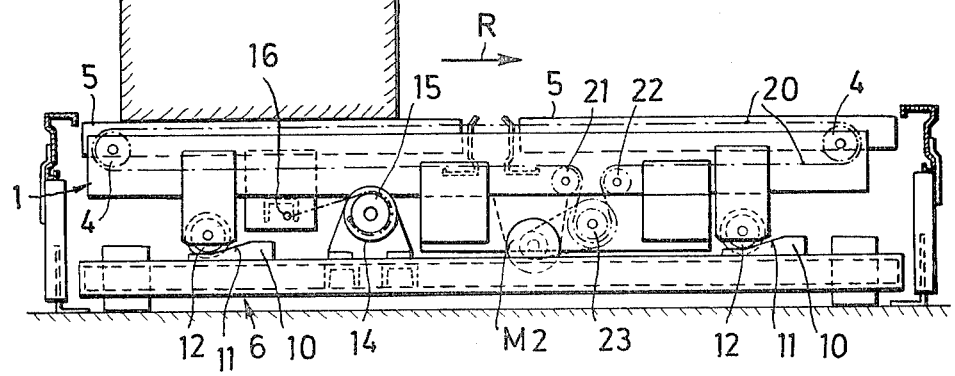
FIG. 2 is a section through the conveyors along the line I—I of FIG. 1.

As can be gathered from FIG. 2, the bottom run of the chain 20 so extends between the two end reversing rollers 4 around reversing rollers 21, 22 and a sprocket 23 therebetween that the latter has most of its periphery in mesh with the chain 20. The sprocket 23, which is driven by a motor $M_2$, has an elongated shaft; disposed at the other end thereof is another pinion which drives the second chain 20 of conveyor 1 similarly and synchronously. Conveniently, the motor $M_2$ is secured to the base of the conveyor 1 between the two parallel chains 20.

Preferably, the cable or chain drive 14 and the motor $M_2$ can be so controlled together that the motor $M_2$ is "off" in the absence of conveyance—i.e., when the top run of the chains 20 is below the conveying plane of the rolls 5. This feature greatly reduces wear and tear of the chains 20 since they rotate only during transverse conveyance in the direction R.

However, the motor $M_2$ can be fixedly secured on the base 6, in which event the chains 20 are kept tensioned by compensating rollers mounted on the movable conveyor 1 for pivoting or displacement.

In a very advantageous embodiment of the invention (not shown), the chains 20 have on both sides of the chain run a number of running rollers which, with the chains 20 in the conveying position, are pressed by the self-weight of an article G against a bearing surface for the latter rollers, such surface being stationary relatively to the transfer conveyor 1. The pressure causes the idling running rollers to rotate, with the result that an article G on such rollers moves in the transverse conveying direction R at substantially twice the speed of the conveying chain. This simple feature enables large transverse distances to be covered. The bearing surface which is stationary in relation to the conveyor 1 can, with advantage, take the form of a guide rail for the running rollers.

When an item G is being conveyed in the direction S of the first conveyor 2, the driven rolls 5 move the item over the two parallel chains 20 of the lowered (inoperative) transfer conveyor 1. When the item G is above the two chains 20, the drive 14 is operated to raise the conveyor 1 into its operative position. When the top run of the parallel chains 20 projects beyond the conveying plane of the conveyors 2, 3, the item G is picked up and raised and, since the chain-driving motor $M_2$ is switched on synchronously by the drive 14, the item moves in the transverse direction R to the second conveyor 3 on which it is deposited in a similar way, the top run of the two chains returning below the conveying plane of the second conveyor 3; the rolls 5 thereof engage with the item G and convey the same onwards in the longitudinal conveying direction T of FIG. 1.

The conveying system of FIG. 1 provides a free choice of conveyance by the transfer conveyor 1 in both directions between the conveyors 2 and 3. When the conveyor 1 is retracted, conveyance continues in the direction S and in the direction T. Advantageously, the mechanism for lifting the transfer conveyor is adapted to be controlled in dependence upon the weight or size of article G which it is required to convey, in which case the conveying system of FIG. 1 can be used as a sorting facility for articles G of different weights or different sizes.

What is claimed is:

1. A transfer conveyor apparatus suitable for the optional transfer of piece-goods from a first roller track conveyor to a second roller track conveyor, said transfer conveyor apparatus comprising:
   (a) a transfer conveyor including,
      (i) at least one endless, flexible filamentary conveying element,
      (ii) guiding means for said conveying element, operable to guide said conveying element around an endless path including an upper, conveying run and a lower, return run, and
      (iii) a first driving motor for driving said guiding means;
   (b) a base;
   (c) means mounting said transfer conveyor on said base for upward and downward movement with respect to said base, and comprising stationary ramps carried by said base and rollers rotatably mounted on said transfer conveyor and engaging said ramp; and
   (d) a second driving motor mounted on said base for moving said transfer conveyor horizontally and thereby raising said transfer conveyor vertically.

2. A transfer conveyor apparatus according to claim 1 wherein the first and second driving motor are actuated simultaneously for effecting simultaneous raising of the transfer conveyor and actuation of the guiding means.

3. A transfer conveyor apparatus according to claim 1 characterized in that with the transfer conveyor in the conveying position, its rollers are in engagement with inclined surfaces of the ramps.

4. A transfer conveyor apparatus according to claim 1 characterized in that with the transfer conveyor in its inoperative (non-conveying) position, the rollers are in engagement with inclined surfaces of the ramps.

5. A transfer conveyor apparatus according to claim 1 characterized in that the transfer conveyor is lockable in its inoperative position or in its conveying position.

6. A transfer conveyor apparatus according to claim 1 characterized in that the conveying element includes at least two spaced-apart, parallel synchronously controlled conveying chains.

7. A transfer conveyor apparatus according to claim 6 characterized in that each conveying chain is guided by said guiding means including reversing rolls on both sides of a driving sprocket.

8. A transfer conveyor apparatus according to claim 6 characterized in that at least one conveying roll of each roller track conveyor is disposed between said spaced apart conveying chains.

9. A transfer conveyor apparatus according to claim 1 wherein said second driving motor includes a stationary cable drive secured to said transfer conveyor.

* * * * *